United States Patent
Venkatraman et al.

(10) Patent No.: US 7,868,559 B2
(45) Date of Patent: Jan. 11, 2011

(54) ELECTRONIC BALLAST WITH HIGHER STARTUP VOLTAGE

(75) Inventors: Ramakrishnan Venkatraman, Aurora, IL (US); Romel Panlilio, St. Charles, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 432 days.

(21) Appl. No.: 11/720,844

(22) PCT Filed: Dec. 8, 2005

(86) PCT No.: PCT/IB2005/054138
§ 371 (c)(1),
(2), (4) Date: Jun. 5, 2007

(87) PCT Pub. No.: WO2006/061800
PCT Pub. Date: Jun. 15, 2006

(65) Prior Publication Data
US 2009/0224696 A1    Sep. 10, 2009

Related U.S. Application Data

(60) Provisional application No. 60/634,937, filed on Dec. 10, 2004.

(51) Int. Cl.
*H05B 37/02* (2006.01)
(52) U.S. Cl. .................. 315/291; 315/307; 315/209 R

(58) Field of Classification Search ............ 315/307, 315/209 R, 291, 216, 219, 220, 224, 241 R, 315/244, 247, 248, 276, 277, 287, 308, 312, 315/411, DIG. 5, DIG. 7; 363/97, 98, 17, 363/132; 310/359; 336/212
See application file for complete search history.

(56) References Cited

U.S. PATENT DOCUMENTS

| | | | |
|---|---|---|---|
| 5,834,906 A | 11/1998 | Chou et al. | |
| 6,057,652 A * | 5/2000 | Chen et al. | 315/307 |
| 6,459,213 B1 | 10/2002 | Nilssen | |
| 6,621,238 B2 | 9/2003 | Nerone et al. | |
| 6,628,091 B2 * | 9/2003 | Griffin et al. | 315/291 |
| 2002/0003525 A1 | 1/2002 | Hwang | |
| 2002/0185982 A1 | 12/2002 | Shen | |

FOREIGN PATENT DOCUMENTS

EP    1387475 A1    2/2004

* cited by examiner

*Primary Examiner*—Douglas W Owens
*Assistant Examiner*—Jae K Kim

(57) ABSTRACT

An electronic ballast with higher startup voltage includes converter with a switching circuit (40) responsive to a switching control signal (50) and operably connected to a DC bus (30); a DC controller (44) comparing a sensed DC bus voltage signal and a reference DC bus voltage signal to generate the switching control signal (50); and a startup adjustor operably connected to the DC controller (44) to adjust at least one of the sensed DC bus voltage signal and the reference DC bus voltage signal for a predetermined time at startup so that startup DC bus voltage is greater than steady state DC bus voltage.

18 Claims, 4 Drawing Sheets

ELECTRONIC BALLAST WITH HIGHER STARTUP VOLTAGE

CROSS REFERENCE TO RELATED APPLICATION

This application claims the benefit of U.S. provisional application Ser. No. 60/634,937, filed Dec. 9, 2004, the entire subject matter of which is hereby incorporated by reference.

This invention relates generally to electronic ballasts, and more specifically to electronic ballasts with higher startup voltage.

Many electronic ballasts are presently designed for instant starting without electrode heating. This provides instantaneous lamp lighting and reduces the number of lead wires to the lamp from two to one, reducing costs and complexity. Unfortunately, this configuration also requires a higher voltage to start the lamp because the lamp electrode is not heated before lamp ignition. Electronic ballasts for multi-lamp systems are also required to provide independent lamp operation, i.e., if one lamp fails, the other lamps remain lit. The most effective topology to meet this requirement is the self-oscillating ballast, such as electronic ballast employing a push-pull configuration or a current-fed, half-bridge configuration.

Recent developments in lamp design have created problems for self-oscillating ballasts. To meet this demand for more energy efficient lamps which consume less electric power, the gas mixture within the lamps has been changed. Although the new energy efficient lamps work with the present generation of electronic ballasts in many cases, the energy efficient lamps require a higher starting voltage that can exceed the starting voltage capability of the present generation of electronic ballasts.

Two examples of starting problems with the energy efficient lamps are cold temperatures and remotely mounted lamps. Cold temperatures, such as zero degrees Fahrenheit, require a higher starting voltage. Remote mounting, in which the lamp is mounted away from the electronic ballast, creates stray capacitance between the two wires connecting the electronic ballast and the remote lamp. The stray capacitance reduces the voltage available at the lamp, so a higher starting voltage is required at the electronic ballast.

One solution to providing higher starting voltage would be to simply provide a higher voltage to the lamps at all times. This is not possible, however, because of the stress that high voltage operation imposes on system components. At the no-load condition when the lamps are off, the voltage to the lamps is the open circuit voltage (OCV). Stress on system components is a function of OCV and so limits the OCV. Other practical limits, such as the insulation rating on system components like lamp sockets, also limits OCV. A practical design limit for the steady state OCV for a T8 lamp system is around 600 Volts. Unfortunately, the starting problems with the energy efficient lamps may require a starting voltage of 700 Volts so that the lamp will start.

It would be desirable to have an electronic ballast with higher startup voltage that overcomes the above disadvantages.

One aspect of the present invention provides an electronic ballast with higher startup voltage with a converter with a switching circuit responsive to a switching control signal and operably connected to a DC bus; a DC controller comparing a sensed DC bus voltage signal and a reference DC bus voltage signal to generate the switching control signal; and a startup adjustor operably connected to the DC controller to adjust at least one of the sensed DC bus voltage signal and the reference DC bus voltage signal for a predetermined time at startup so that startup DC bus voltage is greater than steady state DC bus voltage.

Another aspect of the present invention provides a method for higher startup voltage for an electronic ballast including providing a reference DC bus voltage signal; determining a sensed DC bus voltage signal; and adjusting at least one of the sensed DC bus voltage signal and the reference DC bus voltage signal for a predetermined time at startup so that startup DC bus voltage is greater than steady state DC bus voltage.

Another aspect of the present invention provides a system for higher startup voltage for an electronic ballast including means for providing a reference DC bus voltage signal; means for determining a sensed DC bus voltage signal; and means for adjusting at least one of the sensed DC bus voltage signal and the reference DC bus voltage signal for a predetermined time at startup so that startup DC bus voltage is greater than steady state DC bus voltage.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

Figure 1:
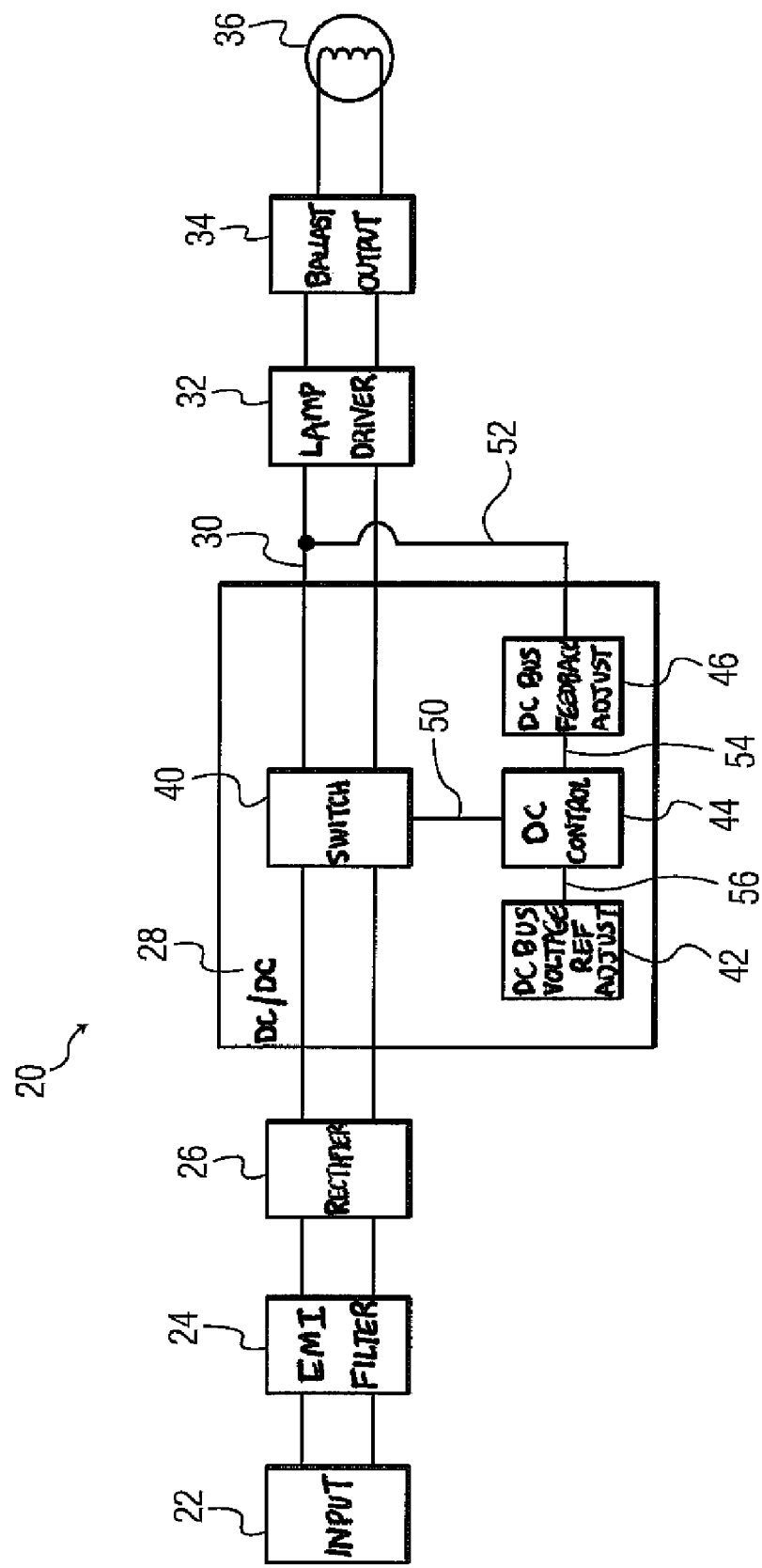
FIG. 1 is a schematic diagram of an electronic ballast with higher startup voltage made in accordance with the present invention.

FIG. 1 is a schematic diagram of an electronic ballast with higher startup voltage made in accordance with the present invention. The electronic ballast provides a higher starting voltage to the lamp at startup, i.e., from the time of energizing the electronic ballast until a predetermined time. After the predetermined time at startup, the electronic ballast provides a lower steady state voltage to the lamp at steady state, i.e., after the predetermined time. The electronic ballast provides the higher starting voltage to the lamp by changing at least one of the sensed DC bus voltage signal and the reference DC bus voltage signal for a predetermined time to increase DC bus voltage.

Electronic ballast 20 receives mains power at mains input 22 and provides power for a lamp 36 at ballast output 34. The exemplary electronic ballast 20 includes an EMI filter/protection circuit 24 operably connected to the mains input 22 and a rectifier 26, which provides DC power to DC/DC converter 28. The DC/DC converter 28 provides DC power to lamp driver 32 on DC bus 30. AC power from the lamp driver 32 is provided to the lamp 36 at the ballast output 34. In an alternative embodiment, the EMI filter/protection circuit 24 and rectifier 26 can be omitted and the DC/DC converter 28 powered directly from a DC power source.

The DC/DC converter 28 includes a switching circuit 40, which switches to control the voltage on the DC bus 30 in response to a switching control signal 50 from DC controller 44. The DC controller 44 compares a sensed DC bus voltage signal to a reference DC bus voltage signal to generate the switching control signal 50. The DC/DC converter 28 includes a startup adjustor, such as DC bus voltage feedback adjustor 46 or DC bus voltage reference adjustor 42. The startup adjustor adjusts at least one of the sensed DC bus voltage signal and the reference DC bus voltage signal so that the startup DC bus voltage on the DC bus 30 is greater than the steady state DC bus voltage on the DC bus 30. This increases the starting voltage to the lamp 36 at the ballast output 34 for a predetermined time, after which the voltage to the lamp 36 at the ballast output 34 is the steady state voltage.

The predetermined time, startup DC bus voltage, and steady state DC bus voltage are selected for the particular electronic ballast design and application. The predetermined time can be any time long enough to allow the lamp to start and short enough to avoid degradation of lamp system components. In one embodiment, the predetermined time is about 0.3 to 5.0 seconds. In another embodiment, the predetermined time is about 0.7 to 1.3 seconds. In yet another embodiment, the predetermined time is about 1 second. The startup DC bus voltage and steady state DC bus voltage determine the lamp's starting voltage and steady state voltage, respectively. The startup DC bus voltage can have any value large enough to start the lamp and small enough to avoid degradation of lamp system components. In one experimental example, an electronic ballast had a startup DC bus voltage of about 550 Volts and a starting voltage to the lamp at the ballast output of about 2000 Volts peak-to-peak, and a steady state DC bus voltage of about 450 Volts and a steady state voltage to the lamp at the ballast output of about 1600 Volts peak-to-peak.

In one embodiment, the startup adjustor is the DC bus voltage feedback adjustor 46 receiving a raw sensed DC bus voltage signal 52 determined at the DC bus 30. The DC bus voltage feedback adjustor 46 generates a final sensed DC bus voltage signal 54 in response to the raw sensed DC bus voltage signal 52. The DC controller 44 compares the final sensed DC bus voltage signal 54 to a reference DC bus voltage signal 56 to determine the switching control signal 50. The DC bus voltage feedback adjustor 46 is active at lamp startup to adjust the raw sensed DC bus voltage signal 52 downward to generate the final sensed DC bus voltage signal 54. The switching control signal 50 causes the switching circuit 40 to set the voltage on the DC bus 30 to a startup DC bus voltage in response to the low final sensed DC bus voltage signal 54. After a predetermined time, the DC bus voltage feedback adjustor 46 ceases adjusting, so that the final sensed DC bus voltage signal 54 is equal to the raw sensed DC bus voltage signal 52. The voltage on the DC bus 30 decreases to the steady state DC bus voltage for steady state operation. The DC bus voltage reference adjustor 42 can be omitted in this embodiment as desired.

In an alternative embodiment, the startup adjustor is the DC bus voltage reference adjustor 42 providing the reference DC bus voltage signal 56 to the DC controller 44. In this embodiment, the DC bus voltage feedback adjustor 46 can be omitted: the raw sensed DC bus voltage signal 52 is equal to the final sensed DC bus voltage signal 54. The DC controller 44 compares the raw sensed DC bus voltage signal 52 to the reference DC bus voltage signal 56 to determine the switching control signal 50. The DC bus voltage reference adjustor 42 is active at lamp startup to adjust the reference DC bus voltage signal 56 upward to a startup value. The switching control signal 50 causes the switching circuit 40 to set the voltage on the DC bus 30 to a startup DC bus voltage in response to the high reference DC bus voltage signal 56. After a predetermined time, the DC bus voltage reference adjustor 42 ceases making adjustment, so that the reference DC bus voltage signal 56 is set to a steady state value. The voltage on the DC bus 30 becomes the steady state DC bus voltage for steady state operation.

Those skilled in the art will appreciate that the DC bus voltage feedback adjustor 46 can be used in combination with the DC bus voltage reference adjustor 42 as desired. Any adjustment that changes the sensed DC bus voltage signal relative to the reference DC bus voltage signal by a desired amount during lamp startup increases the voltage on the DC bus 30 to the desired startup voltage.

Figure 2:
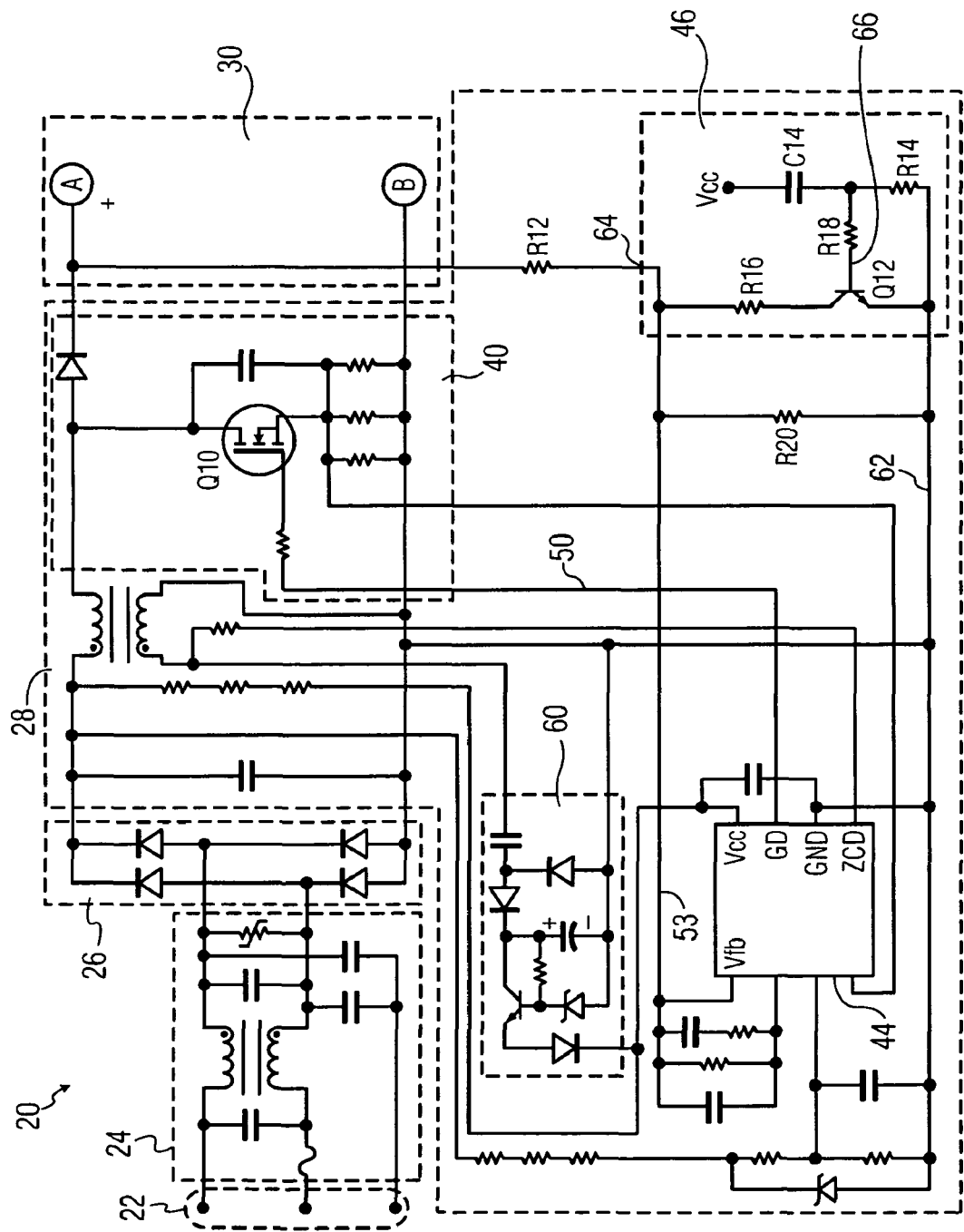
FIGS. 2 & 3 are schematic diagrams of a circuit for an electronic ballast with higher startup voltage made in accordance with the present invention.
Figure 3:
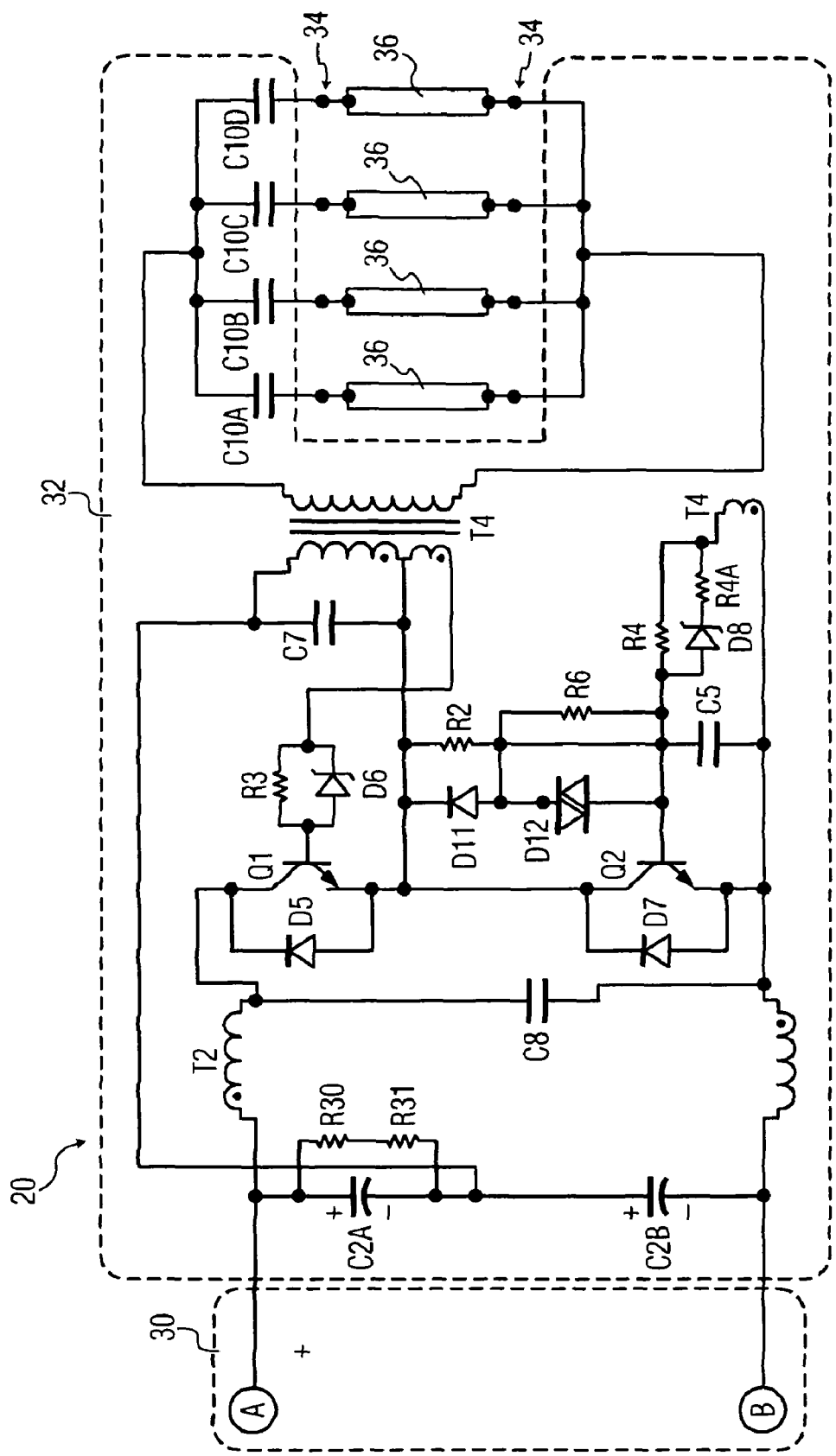

FIGS. 2 & 3, in which like elements share like reference numbers with FIG. 1, are schematic diagrams of a circuit for an electronic ballast with higher startup voltage made in accordance with the present invention. In the example of FIGS. 2 & 3, the startup adjustor is a DC bus voltage feedback adjustor that adjusts the sensed DC bus voltage signal.

In this embodiment, the rectifier 26 is a full bridge rectifier, the DC/DC converter 28 is a boost-type power factor correction (PFC) circuit, and the lamp driver 32 is a current fed, half-bridge self-oscillating circuit. The DC/DC converter 28 includes a PFC IC controller, such as model number L6561 manufactured by STMicroelectronics, as the DC controller 44. Power supply 60 provides power for the DC controller 44. The DC controller 44 provides the switching control signal 50 to MOSFET Q10 of the switching circuit 40. The DC controller 44 receives the sensed DC bus voltage signal 53 at pin $V_{fb}$. The reference DC bus voltage signal (not shown) for comparison to the sensed DC bus voltage signal 53 is internally generated by the DC controller 44. The sensed DC bus voltage signal 53 is generated at connection 64 of the voltage divider including resistors R12 and R20 connected in series between the DC bus 30 and common 62. The startup adjustor is the DC bus voltage feedback adjustor 46.

The DC bus voltage feedback adjustor 46 includes resistor R16 and switch Q12 connected in parallel across resistor R20 of the voltage divider. The RC network, including capacitor C14 and resistor R14 connected in series between system voltage $V_{cc}$ and common 62, provides an activation signal 66 through resistor R18 to the base of switch Q12, which is an npn transistor. The values of the capacitor C14 and resistor R14 of the RC network determine the predetermined time during which voltage on the DC bus 30 is held at the startup DC bus voltage above the steady state DC bus voltage. During startup, the capacitor C14 charges and the activation signal 66 is high, so that the switch Q12 conducts and resistor R16 is connected in parallel with resistor R20 between the connection 64 and common 62. This reduces the sensed DC bus voltage signal 53 at the DC controller 44, which compares the sensed DC bus voltage signal 53 and the reference DC bus voltage signal and sets the switching control signal 50 to switching circuit 40 to set the voltage on the DC bus 30 to the startup DC bus voltage. Once the capacitor C14 is charged sufficiently, defining the predetermined time, the activation signal 66 goes low enough that the switch Q12 no longer conducts. The DC bus voltage feedback adjustor 46 is no longer active and the voltage on the DC bus 30 decreases from the startup DC bus voltage to the steady state DC bus voltage in response to the increase in the sensed DC bus voltage signal 53.

Those skilled in the art will appreciate that any DC bus voltage feedback adjustor which changes the relative values of the resistance of the voltage divider between the startup and steady state operation can be used. In one embodiment, the resistance across resistor R20 is decreased by switching in resistors in parallel with resistor R20 at startup as discussed above. In an alternative embodiment, the resistance across resistor R12 is increased at startup by switching in resistors in serial with resistor R12. The same result can be achieved by increasing the sensed DC bus voltage signal 53 after the predetermined time. In one embodiment, the resistance across resistor R20 is increased by switching in resistors in series with resistor R20 after startup. In an alternative embodiment, the resistance across resistor R12 is decreased after startup by switching in resistors in parallel with resistor R12.

In an alternative embodiment, the startup adjustor is a DC bus voltage reference adjustor. The DC controller can be made of discrete components generating the reference DC bus voltage signal or can be an integrated circuit in which the reference DC bus voltage signal is adjustable. A transistor switching circuit including an RC network, similar to that used as the DC bus voltage feedback adjustor 46 above, can be used to switch the reference DC bus voltage signal to a higher value for the predetermined time at startup and a lower value after the predetermined time. Typically, the transistor switching circuit switches resistors connected in serial or in parallel with resistors generating the reference DC bus voltage signal. The RC network determines the predetermined time.

Figure 4:
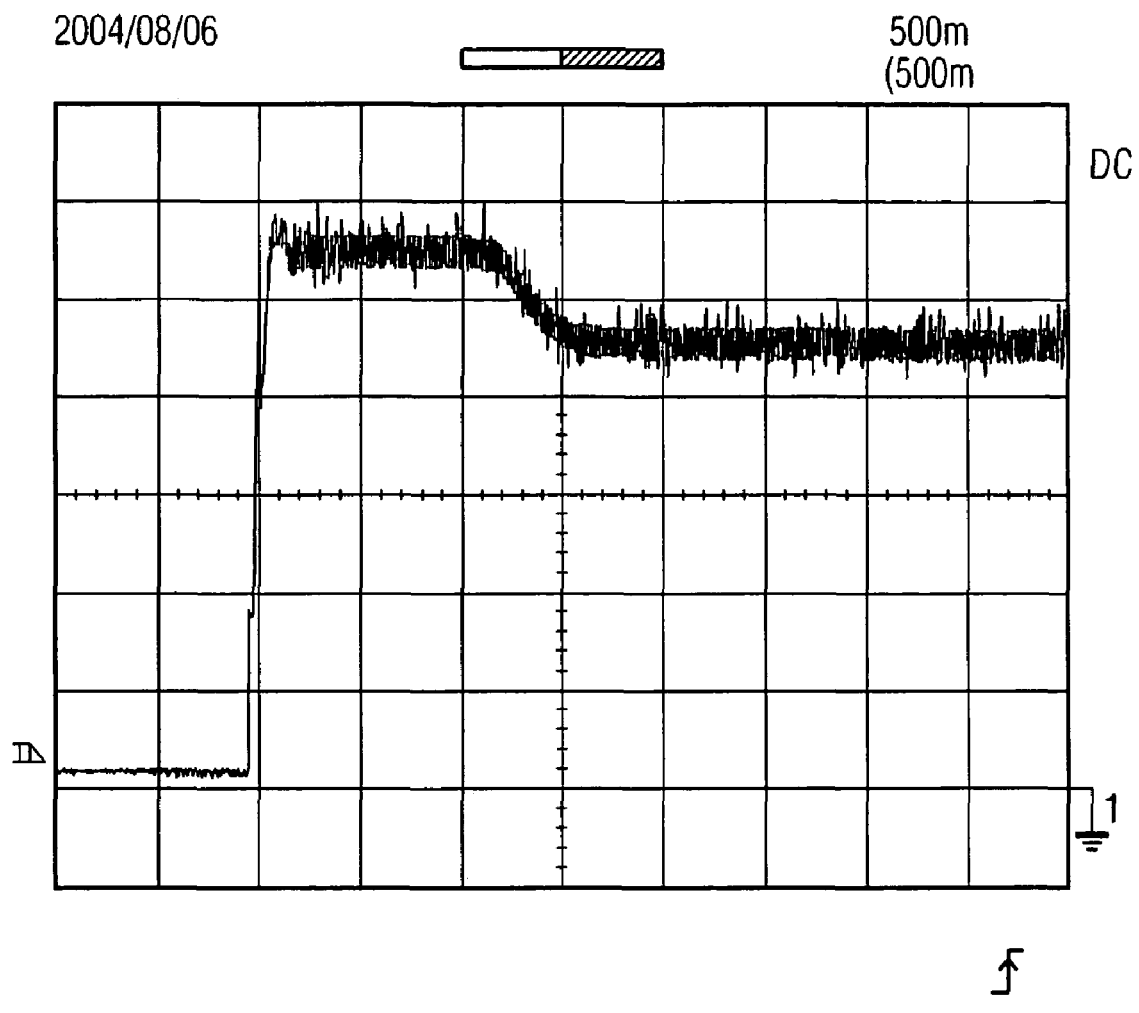
FIG. 4 is an experimental trace of DC bus voltage for an electronic ballast with higher startup voltage made in accordance with the present invention.

FIG. 4 is an experimental trace of DC bus voltage for an electronic ballast with higher startup voltage made in accordance with the present invention. The electronic ballast used a DC bus voltage feedback adjustor as described for FIG. 2 as the startup adjustor. At startup, the startup adjustor is active and the DC bus voltage increases from zero to the startup DC bus voltage of about 550 Volts. After the predetermined time of about 1 second, the startup adjustor ceases to be active and the DC bus voltage is reduced to the steady state DC bus voltage of about 450 Volts. Those skilled in the art will appreciate that the values of the startup DC bus voltage, the predetermined time, and the steady state DC bus voltage can be selected for a particular electronic ballast as desired.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. A device including an electronic ballast, the electronic ballast comprising:
    a switching circuit receiving a DC input voltage and outputting a DC bus voltage on a DC bus, the switching circuit being responsive to a switching control signal to generate the DC bus voltage;
    a DC bus voltage feedback adjustor sensing the DC bus voltage output by the switching circuit and in response thereto supplying a sensed DC bus voltage signal; and
    a DC controller comparing the sensed DC bus voltage signal to a reference DC bus voltage signal and generating the switching control signal in response to the comparison, and a voltage divider connected between the DC bus and common, the voltage divider having a first resistor connected between the DC bus and a connection and a second resistor connected between the connection and the common, the voltage divider generating the sensed DC bus voltage signal at the connection
    wherein the DC bus voltage feedback adjustor adjusts the sensed DC bus voltage for a predetermined time during each startup period, such that a startup DC bus voltage during the predetermined time is greater than a steady state DC bus voltage during a steady-state operation of the electronic ballast, and wherein the DC bus voltage feedback adjustor switches a third resistor in parallel with the second resistor.

2. The device of claim 1 further comprising:
    a voltage divider connected between the DC bus and common, the voltage divider having a first resistor and a second resistor connected in series, the voltage divider generating the sensed DC bus voltage signal at a connection between the first resistor and the second resistor, wherein the DC bus voltage feedback adjustor is operably connected to the voltage divider to decrease a voltage at the connection for the predetermined time at the startup.

3. The device of claim 1 further comprising:
    a voltage divider connected between the DC bus and common, the voltage divider having a first resistor and a second resistor connected in series, the voltage divider generating the sensed DC bus voltage signal at a connection between the first resistor and the second resistor, wherein the DC bus voltage feedback adjustor is operably connected to the voltage divider to increase a voltage at the connection after the predetermined time.

4. The device of claim 1 wherein the predetermined time is between 0.3 and 5.0 seconds.

5. The device of claim 1 wherein the predetermined time is between 0.7 and 1.3 seconds.

6. The device of claim 1 wherein the startup DC bus voltage is about 550 Volts and the steady state DC bus voltage is about 450 Volts.

7. The device of claim 1 further comprising a rectifier operably connected to provide the DC input voltage to the switching circuit.

8. The device of claim 1 further comprising a lamp driver operably connected to the DC bus to receive the DC bus voltage and in response thereto to output an AC voltage for driving a lamp.

9. A method of operating a ballast that supplies power to a lamp, the method comprising:
    receiving a DC input voltage;
    converting the DC input voltage to a DC bus voltage in response to a control signal and providing the DC bus voltage on a DC bus;
    providing a reference DC bus voltage signal;
    sensing the DC bus voltage to generate a DC bus voltage signal;
    comparing the sensed DC bus voltage signal to the reference DC bus voltage signal and generating the control signal in response to the comparison; and
    adjusting at least one of the sensed DC bus voltage signal and the reference DC bus voltage signal for a predetermined time during each startup period, such that a startup DC bus voltage during the predetermined time is greater than a steady state DC bus voltage during a steady-state operation of the ballast, wherein sensing the DC bus voltage signal comprises sensing DC bus voltage signal with a voltage divider connected between the DC bus and common, the voltage divider having a first resistor connected between the DC bus and a connection and a second resistor connected between the connection and the common, wherein the voltage divider generates the sensed DC bus voltage signal at the connection, and wherein the adjusting step comprises switching a third resistor in parallel with the second resistor.

10. The method of claim 9 further comprising ceasing the adjusting after the predetermined time.

11. The method of claim 9 wherein the predetermined time is determined by an RC network.

12. A system for supplying power to a lamp, the system comprising:
    a switching circuit receiving a DC input voltage and outputting a DC bus voltage on a DC bus, the switching circuit being responsive to a control signal to generate the DC bus voltage;
    means for providing a reference DC bus voltage signal;

means for sensing the DC bus voltage output by the switching circuit and in response thereto providing a sensed DC bus voltage signal;

a DC controller comparing the sensed DC bus voltage signal to the reference DC bus voltage signal and generating the control signal in response to the comparison; and means for adjusting at least one of the sensed DC bus voltage signal and the reference DC bus voltage signal for a predetermined time during each startup period, such that a startup DC bus voltage during the predetermined time is greater than a steady state DC bus voltage during a steady-state operation of the system; and a voltage divider connected between the DC bus and common, the voltage divider having a first resistor connected between the DC bus and a connection and a second resistor connected between the connection and the common, the voltage divider generating the sensed DC bus voltage signal at the connection, wherein the means for adjusting switches a third resistor in parallel with the second resistor.

13. The system of claim 12 further comprising means for ceasing the adjusting after the predetermined time.

14. The system of claim 12 further comprising means for determining the predetermined time.

15. The device of claim 1, further comprising at least one lamp driven by the electronic ballast, wherein during the predetermined time during the startup period the electronic ballast supplies a lamp voltage to the lamp that is sufficient to start the lamp without pre-heating a lamp electrode.

16. The method of claim 9, further comprising:
converting the DC bus voltage to an AC lamp voltage; and
supplying the AC lamp voltage to a lamp,
wherein during the predetermined time during each startup period, the AC lamp voltage is sufficient to start the lamp without pre-heating a lamp electrode.

17. The system of claim 12, further comprising a lamp driver operably connected to the DC bus to receive the DC bus voltage from the switching circuit and in response thereto to output an AC lamp voltage for driving a lamp.

18. The system of claim 12, further comprising at least one lamp driven by the electronic ballast, wherein during the predetermined time during each startup period the electronic ballast supplies a lamp voltage to the lamp that is sufficient to start the lamp without pre-heating a lamp electrode.

* * * * *